United States Patent
Loontjens et al.

(10) Patent No.: US 6,583,200 B2
(45) Date of Patent: Jun. 24, 2003

(54) PROCESS FOR THE PRODUCTION OF A POLYOLEFIN-BASED COMPOSITE MATERIAL OF HIGH RIGIDITY

(75) Inventors: Jacobus A. Loontjens, Meerssen (NL); Sander Langereis, Geleen (NL)

(73) Assignee: DSM N.V., Heerlen (NL)

(*) Notice: Subject to any disclaimer, the term of this patent is extended or adjusted under 35 U.S.C. 154(b) by 0 days.

(21) Appl. No.: 10/050,040

(22) Filed: Jan. 17, 2002

(65) Prior Publication Data

US 2002/0137833 A1 Sep. 26, 2002

Related U.S. Application Data

(63) Continuation of application No. PCT/NL00/00467, filed on Jul. 2, 2000.

(30) Foreign Application Priority Data

Jul. 19, 1999 (NL) .............................................. 1012636

(51) Int. Cl.[7] .............................. C08K 9/00; C08K 3/34; C08F 4/32
(52) U.S. Cl. ........................ 523/216; 523/206; 524/492; 524/515; 526/227
(58) Field of Search ................................. 523/216, 206; 524/492, 515; 526/227

(56) References Cited

U.S. PATENT DOCUMENTS

5,973,053 A * 10/1999 Usuki et al.
6,271,297 B1 * 8/2001 Ishida

FOREIGN PATENT DOCUMENTS

EP 0807659 11/1997

* cited by examiner

*Primary Examiner*—Tae H. Yoon
(74) *Attorney, Agent, or Firm*—Pillsbury Winthrop LLP

(57) ABSTRACT

A process for production of a polyolefin-based composite material of high rigidity, containing a polyolefin and a layered clay, involves impregnating a layered, swellable clay which is interstratified with a tetraalkyl cation, with at least one polymerizable monomer and then mixing this impregnated clay with a polyolefin and a peroxide, at a temperature above the melting point of the polyolefin. A polyolefin-based composite material containing 98–50 wt. % of a polyolefin, 1–50 wt. % of another homo- or copolymer and 1–50 wt. % of a layered clay, wherein the ratio between the modulus of elasticity of the material and that of the initial polyolefin, at a temperature which is 30° C. below the melting temperature of the polyolefin, is higher than or equal to 1 has high rigidity.

10 Claims, 2 Drawing Sheets

Figure 1:
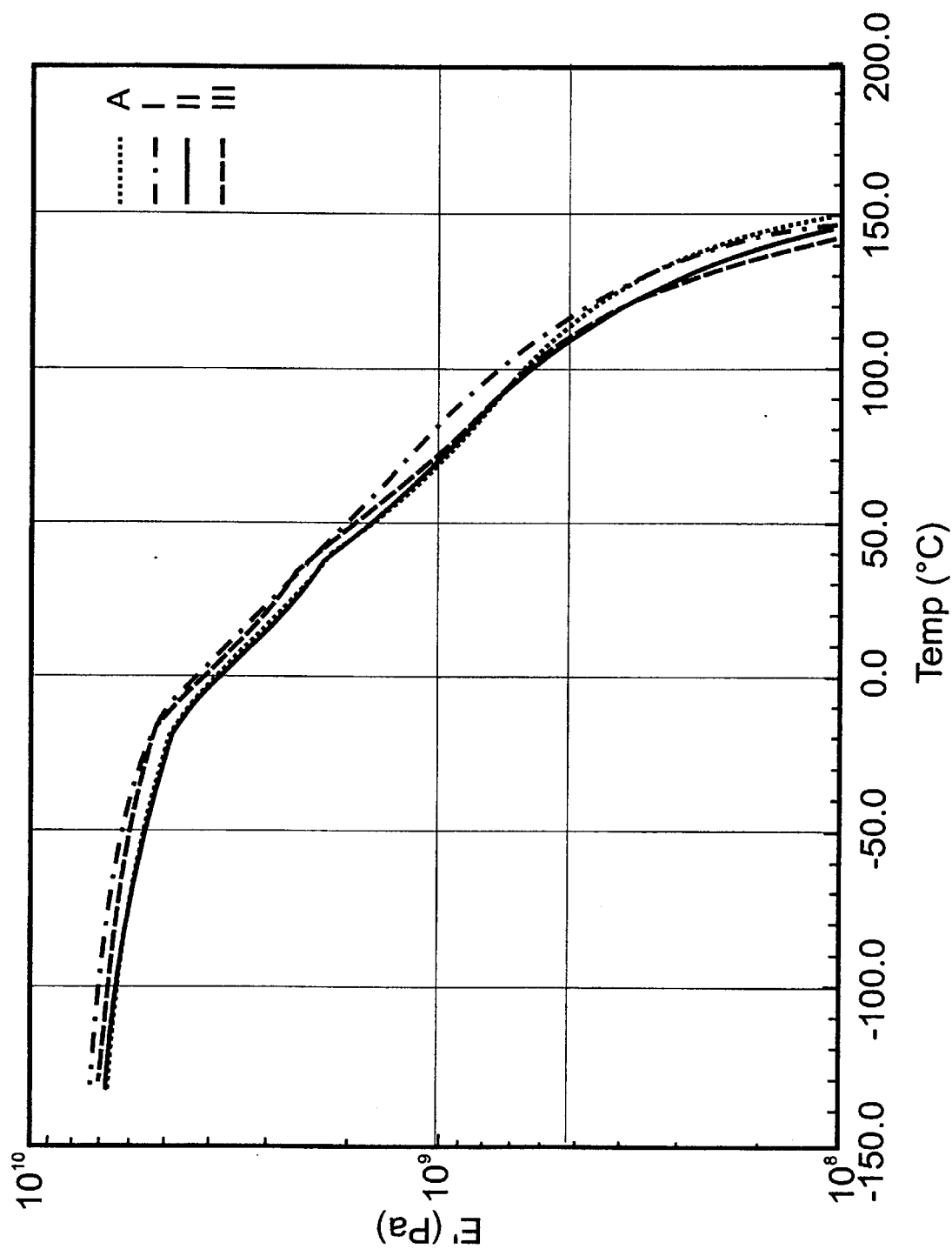

PROCESS FOR THE PRODUCTION OF A POLYOLEFIN-BASED COMPOSITE MATERIAL OF HIGH RIGIDITY

CROSS REFERENCE TO RELATED APPLICATION

This is a Continuation of International Application No. PCT/NL00/00467 filed Jul. 2, 2000 which designated the U.S. and that International Application was published under PCT Article 21(2) in English. The PCT application is hereby incorporated in its entirety by reference.

FIELD OF INVENTION

The invention relates to a process for the production of a polyolefin-based composite material of high rigidity, said material comprising a polyolefin and a layered clay.

BACKGROUND INFORMATION

Such a process is known from EP-A-807,659, according to which a modified polyolefin or a polyolefin containing such a modified polyolefin is mixed with a swellable clay in the form of a layered silicate which has been treated (interstratified) with a tetraalkylammonium cation, resulting in a polyolefin-based composite material of high rigidity.

A drawback of said process is that prior to mixing the polyolefin with the silicate, both the silicate and the polyolefin have to be subjected to a pretreatment.

BRIEF DESCRIPTION OF THE DRAWING FIGURES

Figure 2:
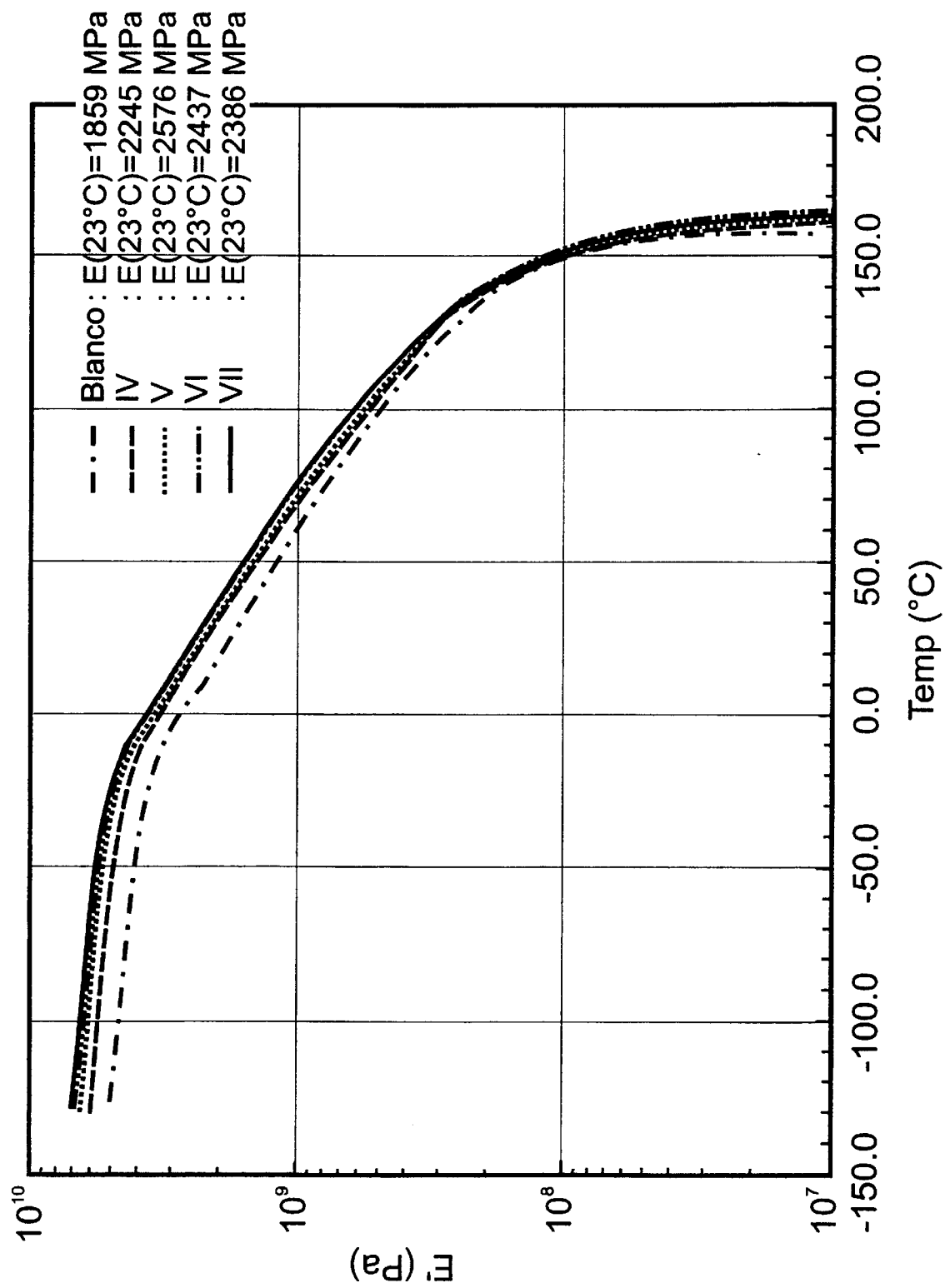

FIG. 1 is a graphic representation of rigidity as a function of temperature for polyolefin-based composites of Examples I, II, III and A; and FIG. 2 is a graphic representation of the rigidity a function of temperature for polyolefin-based composites of Examples IV, V, VI and VII.

SUMMARY

The aim of the invention is to provide a process which is free of this drawback.

This aim is achieved in that the polyolefin-based composite material is obtained by impregnating a layered, swellable clay which is interstratified with a tetraalkylonium cation, with at least one polymerizable monomer and then mixing this impregnated clay with a polyolefin and a peroxide, at a temperature above the melting temperature of the polyolefin.

In this way it is achieved that pretreatment of the polyolefin resulting in a modified polyolefin is not necessary any more in order to obtain a polyolefin-based composite material having a comparable or improved rigidity with the same quantity of clay. This improved rigidity is manifest in particular at an elevated temperature. Also, due to the process of the invention a costly process step is made superfluous.

DETAILED DESCRIPTION

The layered, swellable clay that is used in the process according to the invention is for instance a layered clay containing magnesium silicate or aluminium silicate. Examples of suitable types of clay are smectite types of clay, such as montmorillonite, saponite, beidellite, hectorite, nontronite, volkonskoite, pyroysite, sauconite, magadiite, kenyaite and stevensite; vermiculite types of clay such as trioctaedral vermiculite and dooctaedral vermiculite; and micas, such as muscovite, phlogopite, biotite, lepidolite, paragonite and tetrasilicic.

Montmorillonite is used by preference, because this clay swells readily and thus easily absorbs polymerizable monomers.

In order to be able to be impregnated with one or more polymerizable monomers, the layered clay first has to be treated with a tetraalkylammonium or tetraalkylfosfonium salt, as described for instance in "Interlayer Structure and Molecular Environment of Alkylammonium Layered Silicates", R. A. Vaia, T. K. Teukolsky, E. P. Giannelis, Chem. Mater. 1994, Vol 6, No.7, 1017–1022. The result is a so-called interstratified clay.

The polymerizable monomers that are used in the process according to the invention can be polar, less polar and non-polar monomers. The monomers have at least one unsaturated C=C-bond. By preference, at least one monomer of a polar nature is used. Polar monomers are monomers having a dipole moment greater than 1.0 D. Less polar monomers are monomers having a dipole moment of less than 1.0 D. Non-polar monomers do not have a dipole moment. The polarity is measured in the gas phase (Handbook of Chemistry and Physics, 66th Edition, CRC Press, pp. E58–E60).

Polar monomers are for instance monomers which contain at least one nitrogen and/or oxygen atom. Examples of such monomers are monomers containing a carboxylic acid group, an ester group, a hydroxyl group, an epoxy group, an anhydride group, a nitrile group, an amide group, an imide group or a pyridine group. Examples are, for instance, acrylic acid, methacrylic acid, maleic acid, fumaric acid, itaconic acid, citric acid, maleic anhydride, itaconic anhydride, glycidyl acrylate, glycidyl methacrylate, allyl glycidyl ether, allyl amine, aminoethyl methacrylate, 2-hydroxyethyl acrylate, maleimide, 2-vinyl pyridine and 1-vinyl-2-pyrrolidone. Preferably, monomers containing an epoxy group are selected from this group of monomers, with particular preference being given to glycidyl methacrylate.

Examples of less polar monomers and non-polar monomers are stryrene-containing monomers or diene-containing monomers. Examples of these are styrene, $\alpha$-methylstyrene, p-methylstyrene, 1,3-butadiene and isoprene. Preferably, a styrene-containing monomer is chosen from this group of monomers. By special preference, these are styrene and $\alpha$-methylstyrene.

The layered, interstratified clay is preferably impregnated with a mixture of two monomers which are copolymerizable, the first monomer being a polar monomer and the second one being a monomer that is non-polar or less polar than the first one. The mixture of two monomers preferably consists of a mixture of a styrene-containing monomer and a monomer containing an epoxy group.

As peroxide can be used the known and commercially available peroxides. Examples of peroxides that can be used are: t-butyl peroxybenzoate, t-butyl peroxy-2-ethylhexanoate, bis(t-butyl peroxyisopropyl)benzene, acetyl cyclohexane sulphonyl peroxide, t-butyl hydroperoxide, di-lauroyl peroxide and di-cumyl peroxide. The peroxides are generally used in an amount of 0.01–0.5 wt. % relative to the amount of the polyolefin in the polyolefin-based composite material, preferably in an amount of 0.05–0.3 wt. %. The peroxide can be mixed together with the monomer during the impregnation of the clay; it can also, and with preference, be added during the mixing of the impregnated clay with the polyolefin, or be present in the polyolefin. It is preferred that also the polyolefin contains at least part of the monomer(s), before the mixing of the impregnated clay with the polyolefin. As a result of the process of the present invention, the polymerizable monomer(s) is (are) polymerized to form the corresponding homo- or copolymer as well as a graft (co) polymer of the polyolefin.

Suitable polyolefins are homo- or copolymers of α-olefins, internal olefins, cyclic olefins and di-olefins. In particular, the process is suitable for enhancement of the rigidity of homo- or copolymers of α-olefins. The α-olefin is preferably chosen from the group comprising ethylene, propylene, n-butene, n-pentene, n-heptene and n-octene (substituted or non-substituted), mixtures thereof being also suitable. More preferably, a homo- or copolymer of ethylene and/or propylene is used as polyolefin. Examples of such polyolefins are homo- and copolymers of (semi-) crystalline polyethylene of both high and low density (for instance HDPE, LDPE and LLDPE) and polypropylene homo- and copolymers (PP and EMPP). It is also possible to use as polyolefin amorphous or rubber-like copolymers on the basis of ethylene and another α-olefin; for instance EPM rubber (ethylene/propylene rubber), EADM rubber, (ethylene/α-olefin/diene rubber), and in particular EPDM rubber (ethylene/propylene/diene rubber).

The polyolefin-based composite material may contain the usual additives for polyolefins, such as for instance UV stabilizers, flame retardants, antioxidants, nucleating agents, colorants and plasticizers.

The layered swellable clay, treated with a tetraalkyl cation, can be impregnated with at least one monomer and a peroxide by for instance mixing the monomer with the peroxide and then mixing the resulting mixture with the clay. Then the impregnated clay can be kneaded and mixed together with the olefinic homo- or copolymer. Another possibility is to place the interstratified clay on a powder bed of olefinic homo- or copolymer. Next, the monomer and the peroxide are applied onto the clay and then the whole is mixed with the rest of the olefinic homo- or copolymer and subsequently kneaded. Kneading of the impregnated clay and the peroxide with an olefinic homo- or copolymer takes place at a temperature above the melting temperature of the polyolefin, and above the decomposition temperature of the peroxide. This is normally done in a single- or twin-screw extruder, but it is also possible to make use of for instance a static mixer or a batch mixer.

The invention also relates to a high-rigidity polyolefin-based composite material comprising 98–50 wt. % of a polyolefin, 1–50 wt. % of another homo- or copolymer and 1–50 wt. % of a layered clay.

Such a polyolefin-based composite material is also known from EP-A-807,659, which describes among other things a polyolefin composition comprising 99.9 wt. % of a polyolefin which contains a least 1 wt. % of a modified polyolefin and 0.1–40 wt. % of a layered clay.

A drawback of the polyolefin composition described in EP-A-807,659 is that it has a low rigidity at high temperatures, in particular at temperatures above 100° C.

When a polyolefin-based composite material is prepared with application of the process according to the invention, a polyolefin-based composite material is obtained which also at elevated temperatures possesses a high rigidity.

The high-rigidity polyolefin-based composite material according to the invention is characterized by the ratio of its modulus of elasticity ($M_{poc}$) to the modulus ($M_{po}$) of the initial polyolefin, at a temperature T which is 30° C. or less below the melting temperature $T_m$ of the polyolefin, being higher than or equal to 1.

Preferably the ratio of the modulus of elasticity ($M_{poc}$) of the high-rigidity polyolefin-based composite material to the modulus ($M_{po}$) of the initial polyolefin, at a temperature T which is 15° C. or less below the melting temperature Tm of the polyolefin, is higher than or equal to 1.

The above in formula-form:

$$\frac{M_{poc}}{M_{po}} \geq 1 \text{ at } T \geq T_m - 30° \text{ C. and preferably } \frac{M_{poc}}{M_{po}} 1 \geq T_m - 15° \text{ C.}$$

The layered clay is present in an amount of 1–50 wt. % relative to the total polyolefin-based composite material. The polyolefin is present in an amount of 98–50 wt. % relative to the total polyolefin-based composite materials. The quantity of the other homo- or copolymer originating from the polymerizable monomer or monomers is equal to 1–50 wt. % relative to the total of monomer(s) for the polyolefin-based composite material. The weight ratio between the total of homo- or copolymer and the clay generally is 0.05 up to and including 2, preferably 0.05 up to and including 1.

Further advantages of the polyolefin-based composite materials according to the invention are that they have a lower coefficient of expansion and a better flame retardancy than the initial polyolefins.

The extruded moulded part according to the invention optionally comprises additives, for example other types of fillers and reinforcing materials, for example glass fibres and talcum, flame retardants, foaming agents, stabilizers, anti-blocking agents, slipping agents, acid scavengers, antistatics, flow-promoting agents and colorants and pigments.

The high-rigidity polyolefin-based composite materials according to the invention are very suitable for the production of moldings, for instance by injection molding or extrusion compression. The polyolefin-based composite materials can be used as such for the manufacture of a molding, but they can also be mixed for instance with unmodified polyolefin. Polyolefin-based composite materials which contain a high weight percentage of clay can be seen as masterbatches and can be admixed with unmodified polyolefins in order to get a lower clay content in the molding as a whole. The polyolefin-based composite materials according to the invention are also highly suitable for the production of automobile components. Many of those components are required to have a good rigidity at elevated temperatures as well. Examples of such automobile components are dashboards, bumpers, mudguards and bonnets.

In the polyolefin based material of the invention an additional polar polymer can be present, like a nylon, styrene/acrylonitrile copolymer (SAN), acrylonitril/butadiene/styrene terpolymer (ABS), a styrene/carboxylic acid or styrene/carboxylic acid anhydride copolymer (like styrene/maleic anhydride (SMA) copolymer). Preferably a nylon (or polyamide) is present; the resulting polymeric composition is, due to its ingredients, a well compatibilized blend of a polyolefin and a nylon. As nylons can be used polycaprolactam (nylon 6), polyhexamethylene adipamide (nylon 6,6), polytetramethylene adipamide (nylon 4,6), as well as other nylons known in the art.

The invention will be elucidated in the following by means of Example and comparative experiments, without being restricted thereto.

EXAMPLES

Starting Products

A) Polyolefin

A1) Polypropylene homopolymer, Stamylan® P 15M00, DSM; melting temperature Tm=165° C. (determined with DSC (differential scanning calorimetry), at 10° C./, min).

B) Monomers
B1) Styrene, 99% stabilized with 10–15 ppm 4-t-butylcatechol, Aldrich
B2) Glycidyl methacrylate, 97% stabilized with 100 ppm monomethyl ether hydroquinone, Aldrich
C) Peroxide
C1) Trigonox C®, t-butyl-peroxi-benzoate, 98%, Aldrich
D) Layered clay
D1) Montmorillonite modified with dimethyldi (hydrogenated long hydrocarbon chains) ammonium chloride (125 mer), SCPX 1313, Southern Clay Products Inc.
E) Miscellaneous
E1) Irganox® B225, Ciba Specialty Compounds Preparation of the High-Rigidity Polyolefin-Based Composite Material

Examples I–III and Comparative Experiment A

A solution of the monomer or the monomers, the peroxide and optionally a UV stabilizer was prepared. This solution was added dropwise to the layered clay. When the clay had swollen, polymer powder was added, after which the whole was mixed on a mini-extruder (Cordewener, T=220° C., t=5 min., 200 rpm). In the comparative experiment the UV stabilizer was added as a solid substance. The composition of the various polyolefin-based composite materials is shown in Table 1.

The rigidity of each of the polyolefin-based composite materials at different temperatures is shown in Table 2 and also in FIG. 1. The rigidity (modulus of elasticity, E') was measured in accordance with ASTM D5026 with a frequency of 1 Hz across a temperature range from −130 to 160° C.

The rigidity of the polypropylene at Tm-30° C. was 225 MPa; The rigidity of the polypropylene at Tm-15° C. was 98 MPa.

TABLE 1

| Example/Comparitive experiment | Polyolefin (PO) (wt. %) | Clay (wt. %) | Monomer (wt. %) | Peroxide (wt. % rel. to PO) | Miscellaneous (wt. % rel. to PO) |
|---|---|---|---|---|---|
| I | A1, 86 | D1, 10.7 | B1, 2.2 B2, 1.0 | C1, 0.14 | E1, 0.08 |
| II | A1, 83 | D1, 10.4 | B1, 4.8 B2, 2.2 | C1, 0.31 | E1, 0.18 |
| III | A1, 80 | D1, 10.2 | B1, 6.6 B2, 3.3 | C1, 0.44 | E1, 0.26 |
| A | A1, 89 | D1, 10.0 | — | — | E1, 0.23 |

TABLE 2

| Example | Temperature (° C.) | E-modulus (MPa) |
|---|---|---|
| I | −100 | 6498 |
|   | 23 | 2692 |
|   | 100 | 711 |
| II | −100 | 6126 |
|   | 23 | 2367 |
|   | 100 | 574 |
| III | −100 | 6411 |
|   | 23 | 2631 |
|   | 100 | 561 |
| A | −100 | 6060 |
|   | 23 | 2323 |
|   | 100 | 598 |

Examples IV–VII

A mixture of monomers, the peroxide and a stabilizer (B225) were sprayed over the layered clay. After the swelling of the clay had taken place, the mixture was added to the polypropylene and compounded in the mini-extruder at T=220° C., t=5 min; the screw rotation speed was 250 rpm. The composition of the compounds is given in Table 3.

TABLE 3

| Example | Polyolefin, (PO) (wt. %) | Clay (wt. %) | Monomer (wt. %) | Peroxide (wt. % rel. to PO) | Miscellaneous (wt. % rel. to PO) |
|---|---|---|---|---|---|
| IV | A1, 85.8 | D1, 10.8 | B1, 2.3 B2, 1.1 | 0.027 | 0.07 |
| V | A1, 85.8 | D1, 10.8 | B1, 2.2 B2, 1.1 | 0.053 | 0.07 |
| VI | A1, 85.8 | D1, 10.9 | B1, 2.2 B2, 1.1 | 0.095 | 0.07 |
| VII | A1, 85.8 | D1, 10.8 | B1, 2.2 B2, 1.0 | 0.116 | 0.07 |

The rigidity of these products was measured. The results are given in FIG. 2.

What is claimed is:

1. Process for the production of a polyolefin-based composite material of high rigidity, said material comprising a polyolefin and a layered clay, wherein the polyolefin-based composite material is obtained by impregnating a layered, swellable clay which is interstratified with a tetraalkylonium cation, with at least one polymerizable monomer having at least one unsaturated C=C bond, and then mixing this impregnated clay with a polyolefin and a peroxide, at a temperature above the melting temperature of the polyolefin.

2. Process according to claim 1, wherein the monomer is a polar monomer.

3. Process according to claim 1, wherein the monomer contains at least one nitrogen and/or oxygen atom.

4. Process according to claim 1, wherein the interstratified clay is impregnated with two monomers which are copolymerizable, the first monomer being a polar monomer and the second one being a monomer that is non-polar or less polar than the first one.

5. Process according to claim 4, wherein a mixture of a styrene-containing monomer and a monomer containing an epoxy group is used.

6. Process according to claim 5, wherein the styrene-containing monomer is styrene or α-methyl styrene.

7. Process according to claim 5, wherein the monomer containing an epoxy group is glycidyl methacrylate.

8. Process according to claim 6, wherein the layered clay is montmorillonite.

9. Process according to claim 1, wherein the peroxide is present in, or added to the polyolefin, during the mixing of the impregnated clay with the polyolefin.

10. Process according to claim 1, wherein the polyolefin also contains at least part of the polymerizable monomer(s), before the mixing of the impregnated clay with the polyolefin.

* * * * *

UNITED STATES PATENT AND TRADEMARK OFFICE
CERTIFICATE OF CORRECTION

PATENT NO.    : 6,583,200 B2
DATED         : June 24, 2003
INVENTOR(S)   : Loontjens et al.

It is certified that error appears in the above-identified patent and that said Letters Patent is hereby corrected as shown below:

<u>Title page,</u>
Item [63], please replace the Related U.S. Application Data with the following:
-- [63]   Continuation of application No. PCT/NL00/0467, filed on July 3, 2000. --.

Signed and Sealed this

Seventh Day of October, 2003

JAMES E. ROGAN
*Director of the United States Patent and Trademark Office*